May 9, 1939.   C. I. LEIBENSPERGER ET AL   2,157,713
PROCESS OF MANUFACTURING SUCKER ROD COUPLINGS AND COUPLING SO MADE
Filed June 1, 1937
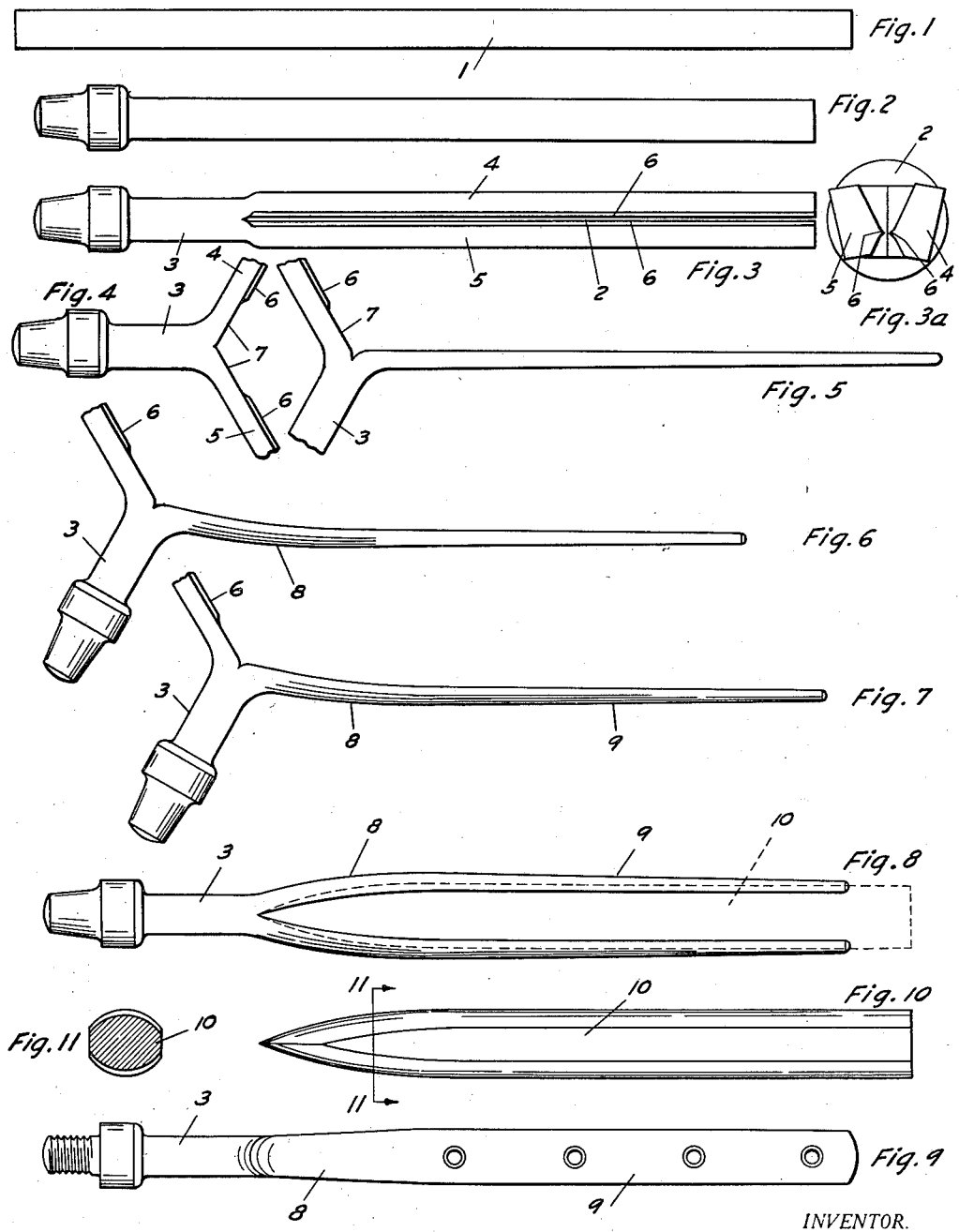
INVENTOR.
Charles I. Leibensperger
Forest H. Thorpe
BY
W. S. Babcock
ATTORNEY.

Patented May 9, 1939

2,157,713

UNITED STATES PATENT OFFICE 2,157,713

PROCESS OF MANUFACTURING SUCKER ROD COUPLINGS AND COUPLINGS SO MADE

Charles I. Leibensperger and Forest H. Thorpe, Columbus, Ohio, assignors to The Columbus Sucker Rod Company, Columbus, Ohio, a corporation of Ohio Application June 1, 1937, Serial No. 145,696

7 Claims. (Cl. 29—148)

The invention to be hereinafter disclosed relates to a process of manufacturing sucker rod couplings, and the couplings so made.

As is well known, the commercial sucker rod or pump rod is, usually, of wood and in a number of sections according to the total length desired. These lengths are connected by couplings. These couplings must be capable of withstanding all strains to which the rods will be put, yet they must be of simple construction and of low cost. In order to more definitely set forth the important features of the present invention, I shall first mention, briefly, the present well known processes and their resulting couplings.

It has been customary in the past to form a coupling member from two similar bars by rolling all but a short section of each to an elongated plate of concavo-convex cross section, one plate being complementary to the other, welding the unshaped portions, with the concaves of the plates opposed, to present a rod-end socket, and then upsetting and threading the end of the welded portions. The high welding temperature necessary is injurious to the metal, producing, so to speak, a weak link in the chain at the very point where the greatest resistance to strains is necessary and the greatest strength is needed. Splitting of the welds in this type is common. Because of the process of manufacture of the plates, when assembled, there is no well defined sharp angle at the crotch where the tapered end of the rod should seat. There is a space or gap at that point. It is not possible to get a solid seat or a firm strong connection. This rapidly increases the resulting looseness and "play" or "lost motion", always resulting in such imperfect fits, as the sucker rod is operated. In addition to the weakening at the weld, due to high temperature, the full length of the entire coupling is seriously affected. Since the greatest mass of metal is at the weld, the cumulative effect will be greatest throughout that area. Likewise, because of the greater mass, the temperature will have to rise even higher throughout that area. This area of highest temperature, in addition to the weld, includes the shoulder or inwardly tapered portion of each plate which most directly receives the tapered end of the rod sections and which is, therefore, subject to the severest strains. This shoulder, then, is also greatly weakened by the welding temperature and, consequently, is subject to breaks. The remainder of the wings is also seriously weakened, as is well known, by the excessive temperature for the welding and therefore does not have the strength or resistance it would have had it not been subjected to such high temperatures. The above refers to wrought iron and furnace heating to welding temperatures, as that is the recognized process for coupling members so made.

Another type, in which steel wing plates may be used, is shown in Patent 1,828,164 to Forest H. Thorpe. In that coupling, the bars from which the wing plates are formed are shaped to wingplate form throughout their lengths, instead of leaving a portion unshaped. From the point of the crotch, when assembled, to the near end, the shape is semi-cylindrical to receive the cylindrical shaft or stem of a coupling block. The end of the rod, beyond the taper, of course, had no seat. There was the same lack of definite, positive, solid seating and corresponding opportunities for "lost motion" and working loose, as in the type first above described. There was the same weakness at the weld, with similar resulting splits, in use. Because of the local action of the electric weld, the area injured by the high temperature was reduced to the weld joint. Also, the coupling elements could be made as screw-machine work. The coupling was a decided advance over previous types but still had the weaknesses mentioned.

A third type is made by starting with a single bar and rolling it out so as to form the two wings. A portion, at one end, sufficient to provide a wrench shank or grip, and leave an end section for upsetting for the pin or box, is left in original bar form. The pin or box is formed later, by the usual upsetting operation. The remainder is rolled out into a single plate of the desired thickness and having a total width equal to the two wings. In rolling, the plate is given the form of two parallel concavo-convex bands merging into a rib. These bands which are a single integral plate are, of course, in the same plane. In order that they may be opposed, one to the other, to receive between them, the sucker rod end, the plate is split lengthwise through the center of the rib and up to the unshaped section. This gives the two wings. Then the two wings must be twisted 90°, each, about their longitudinal axes to present their concaves opposite each other to receive the sucker rod end. This twist, of course, is at the point where the wing joins the shaft or wrench block which, in turn, is the tapered shoulder which must bear the most severe shocks and strains. Twisting the metal, twists the fibre structure, as is well known, setting up highly destructive internal stresses, those on opposite sides of the axis of twist acting opposite or against each other—compression and tension, respectively. The shoulders of the wings are correspondingly weakened. Shoulders formed by twisting the metal this way, are weakened by more than 15% compared to shoulders in which the fibres have not been twisted, as will be readily understood. Where the rolling starts, at the junction of the rolled plate and the shank, the end of the shank must be somewhat tapered. In such an operation, it can not be at right angles. Also, in twisting the wings, at that point, to 90° each, and spreading the split line correspondingly, there is some unavoidable deformation of the near end of the shank and of the shaped shoulder. It would be impossible to get a straight line across the crotch-end of the shank at the apex of the angle between the wings and at right angles to the length of the shrank. In fact, no attempt is made to do so. In practice, the crotch is irregular. It usually slants from one side toward the other and then, for the remainder of its length, slants abruptly back. This reverse slant is produced by the split through the rib prior to twisting back the wings. Obviously, there can be no positive, solid and complete seating of the sucker rod end in such a crotch. In such a process, it is not possible to continue the concave clear up into the crotch. It is not possible to roll it in in forming the plate. And, if it were possible, it would be destroyed in the twisting. Consequently, this type, does not have a continuous concave inner wing surface complementary to the sucker rod end and extending into the crotch.

Most sucker rod couplings are made by one or another of the above three processes.

The main objects of the present invention are to eliminate the above and other objections and defects and provide a simple continuous process for producing, from a single bar, a complete integral coupling member having the full undiminished strength of the metal from end to end; provided with a definite, positive crotch-line and shaped crotch securely and solidly seating a sucker rod end; and having full strength in the wing shoulders.

In order to more clearly disclose the several steps of the process and the construction, operation and use of the coupling member of this invention, reference should be had to the accompanying drawing forming part of the present application. Throughout the several figures of the drawing like reference characters designate the same parts in the different views. A complete coupling, of course, comprises two members—pin and box or male and female. In the present invention both are made by the same process and have the same construction except, of course, that one is externally threaded and the other internally threaded, on the respective connecting end. Accordingly, only the male or pin member will be illustrated in the drawing of this application. The description and claims apply equally to the female or box member.

In the drawing:

Fig. 1 is a side elevation of the metal bar from which the coupling member is made;

Fig. 2 is a like view with one end upset for forming the pin or male end of the member;

Fig. 3 is a similar view showing the member, after the first step of this process;

Fig. 3a is a right hand end view of Fig. 3, enlarged to full size and rotated clockwise 90°;

Figs. 4, 5, 6 and 7 are views similar to Fig. 3, showing one wing of the member, after, respectively, corresponding steps of the process;

Fig. 8 is a side elevation of the member after the final step of this process, the working position of the dart being indicated in dotted lines;

Fig. 9 is a top plan view of Fig. 8, after machining and screw-threading of the pin;

Fig. 10 is a side elevation of the dart which constitutes an inside forming die; and Fig. 11 is a cross section on line 11—11 of Fig. 10, looking in the direction of the arrows.

All views of the drawing are approximately one-half size of the commercial article or product, except Fig. 3a which is about full size. In Fig. 4 only enough of the wings are shown to include, completely, the crotch. In Figs. 5, 6 and 7 one arm is broken off, as unnecessary to a clear disclosure, and in Fig. 5 the pin end is also broken off.

Referring to the drawing in detail, according to the present process, a bar 1 of copper bound steel, after having been upset at one end, in usual and well known manner, to form the pin end of a coupling, as shown in Fig. 2, is next heated to suitable temperature for splitting by means of a knife and is then split lengthwise as indicated in Figs. 3 and 3a. This split is not a shear cut in which the portion at one side of the cut, only, is supported, resulting in a bad twist and distortion. Preferably, in making this split two cooperating blades are used, a lower stationary blade and an upper reciprocable blade. They are exactly alined. As the upper blade is driven toward the lower, the split is made, the travel being calculated to cut completely through the intervening metal of the bar to the edge of the lower knife. Of course, the force of the downward stroke drives the heat-softened bar downward against the edge of the lower knife so that the lower knife does cut upwardly into the bar toward the upper knife. The upper knife makes the greater part of the cut or split, in point of depth, as shown in Fig. 3a. A single full length split 2 is made, in one stroke. Consequently, the bar is so positioned, by a suitable stop, that the descending knife will start its split exactly at the end of the portion reserved unsplit, for the shank 3, and continue straight through to the end. The knife blades are the full length of the cut. The bar is maintained in central position during the splitting operation so that the split will be along longitudinal center line thereof, providing two parallel branches 4 and 5 substantially exactly the same in every respect. While a special mechanism has been perfected for the practical performance of this splitting operation, it is not intended to include it within this application and, therefore, it will not be illustrated or described in detail in this application. The taper of the knives leaves, along the line of completion of the split or actual severance, a rough and irregular fin or rib 6 on the inner face or wall of each newly formed branch 4 and 5, extending from end to end, clear up to the shank and into the crotch.

After splitting, the members 4 and 5 are spread to the position of Fig. 4, in well known manner. The bar is then supported in a vertical position, pin-end down, with the crotch directly in line with and directly below a crotch-finishing or forming tool. This tool has a straight knife edge extending the full width of the bar 1, when in operative position. It is tapered outwardly from its edge on, exactly, the same angle as that of the sucker rod end which is to be seated in that crotch. That is, also, exactly the taper of the dart-end—see Figs.

10 and 11. However, this tool is not curved or convex in cross section. It is a simple flat-sided wedge in cross section. This tool is reciprocated in well known manner, the travel of its stroke being so calculated as to end exactly at the end of the shank, giving a straight, sharp, definite crotch line clear through the bar and at right angles to the length of the shank. At the same time, the wedge shape or tapered walls of the tool press out and completely eliminate the ribs 6 for an appreciable distance 7 outwardly from the crotch. This gives a perfectly smooth flat wall in the crotch portion leading to the crotch or closed end of the split, such as is impossible by rolling, hammering, or other known processes. It is, essentially, a method of toughening, hammer-action or process.

From this point on, each branch is separately shaped or formed to provide the wings. The steps for one wing are duplicated for the other wing. Accordingly, I shall describe only one series of steps. After separately forming the wings, the member, as a whole, is processed to provide a finished product.

After the crotch has been formed, the member is reheated and one of the branches is hammered out or drawn to the desired thickness, width and length, for one of the wings. This is a well known metal working process and, as completed, is shown in Fig. 5. This step, at the same time, completely eliminates the fin or rib and leaves an even, flat inner face or wall from the crotch to the end—see Fig. 5.

Next, the shoulder 8 is formed in this branch by hammering. This is a concavo-convex section extending from near the crotch, to a point just beyond where the tapered end of the rod, when in place, merges with the body of the rod. It is the well known shoulder portion of the coupling member. The shoulder, so formed, merges into the rest of the wing with a contour corresponding to that of the sucker rod face cooperating therewith—see Fig. 6.

After the shoulder has been formed, the remainder of the plate is shaped to the corresponding outer contour 9 of the sucker rod which is to be received between the wings. This may be done by hammering, rolling, or other well known forging or metal working operations. The contour is concavo-convex in lateral cross section.

All operations, after the splitting, to and including that last above mentioned, are forging operations, preferably, by power hammer, thereby toughening and strengthening the metal of the coupling, at every step.

After both branches have been completely formed in accordance with the above process steps, the member is again heated and passed to an operator, who swings the hot member onto a frame, takes the end of each wing in a pair of tongs, and bends the formed branches 4 and 5 into approximately the position of Fig. 8, approximately parallel. It is again heated. An operator grasps the shank with a pair of tongs and shoves the two parallel wings lengthwise along the dart 10 until the dart is firmly seated in the crotch. The dart, of course, rests on the frame of the machine, with its untapered end against a suitable stop so that it may resist the thrust of the operator. The resistance and curvature of the wings, and the taper of the crotch, securely grip the dart and accurately center it in place. As previously stated, this dart is of solid hard metal and an exact counterpart of the corresponding sucker rod end which, later, will be seated in the same position between those wings. It has the same convex curvature in its ends. With the dart thus solidly seated, in the crotch, the operator places the wings of the member, from the shank to the free end, in the position of Fig. 8, beneath the forming plunger or head of a power press. With a single stroke of the press, the forming or shaping of the two wings is completely finished, the inner contour of each, from the crotch to the end, being exactly complementary to the corresponding dart surface and, therefore, to the corresponding sucker rod end surface, with a sharp, straight, well defined, crotch line. In the same operation, the wing ends are both trimmed to the predetermined length and both of the same length. The short flat faces 7 leading from the crotch line are concaved and merged with the shoulder. The sucker rod end, when assembled, goes completely up into the crotch and seats firmly with no space and no lost motion. Its tip seats against the shank for the full width of the crotch and evenly throughout. Or the operator may place the coupling member against a stop and drive the dart, by machine power, into the crotch with sufficient force to shape the crotch walls, following that by the final forming by press. In that case, the crotch line formation could be made by the dart, without the use of a separate tool, as described in carrying out the first step. The first step would then become next to the last step in the forming. The above press operation is, of course, a metal toughening operation, in the same sense as are the other forming steps of this process.

The wings, thus formed, are then, in a single operation, punched and countersunk, on the same press, as shown in Fig. 9, and the pin end is then threaded in well known manner.

The box-end or female member is made in the same way except that it is threaded interiorly instead of exteriorly.

From the above, it will be clear that a single piece of metal forms the entire coupling member; that there are no welds; that the member is never heated to an injurious temperature; that all shaping or forming steps are metal toughening steps tending to increase the strength of the member; that a solid, full-strength, one-piece shank is provided; that there are no injurious, opposing, internal stresses due to twisting; that the shoulders have the full strength of the metal; and that there is firm, solid, full-strength crotch-seating for the sucker-rod end.

While the invention has been described as applied to a sucker-rod connection or coupling member, it will be clear that many other rod connection or couplings or the like may be equally well made with it. A wide range of metal members having a solid portion and two branches leading therefrom in spaced relation to each other, while merging into the solid member or portion at a common point and suitable for the manufacture of rod and similar connections or couplings, may be made, advantageously, by the same process, and it is meant to include all such within this application.

It is thought that the several steps of the process, their order of performance, the manner of carrying them out, and the construction, operation and use of the coupling member produced by said process, will be clear from the preceding detailed description.

Changes may be made in the order of performance and the manner of carrying out the several steps of the process, and in the details of those steps, and many changes may be made in the construction, arrangement and disposition of the various parts of the coupling member, all within the scope of the appended claims, without in any degree departing from the field of this invention, and it is meant to include all such within this application, wherein only one preferred construction and one preferred order of operations has been disclosed, purely by way of illustration and with no thought or intention to in any degree limit the claims by any such illustrative disclosure.

Having thus described our invention, what we claim and desire to protect by Letters Patent is:

1. A process of the character described comprising laterally splitting for a part of its length a bar of metal by means of opposed blades extending the full length of the split to form two connected substantially closely parallel branches having fins extending substantially their full length, and simultaneously removing by compression the aforesaid fins from the inner end of said split toward the opposite end for an appreciable distance and forming with a wedge tip at said inner end of the split a straight crotch-line seat at right angles to the longitudinal axis of said bar and extending laterally completely through said bar in the direction of the aforesaid split.

2. A process of the character described comprising laterally splitting for a part of its length a bar of metal by means of opposed blades extending the full length of the split to form two connected substantially closely parallel branches having inwardly projecting fins extending substantially their full length, driving a wedge longitudinally of said bar into the inner end of said split and thereby simultaneously removing the aforesaid fins for an appreciable distance outwardly from the inner end of the split and forming at said inner end a straight clearly defined crotch-line seat at right angles to the length of said bar and extending through said bar from side to side in the same direction as the aforesaid split and shaping said branches by compression to provide inner faces complementary to the corresponding surfaces of a sucker rod end to be received therebetween.

3. A process of the character described comprising laterally splitting for a part of its length a bar of metal by means of opposed blades extending the full length of the split to form two connected substantially parallel branches having inwardly projecting fins extending substantially their full length, driving a wedge longitudinally of said bar into the inner end of said split and thereby simultaneously removing the aforesaid fins for an appreciable distance outwardly from the inner end of the split and forming at said inner end a straight clearly defined crotch-line seat at right angles to the longitudinal axis of said bar and extending through said bar from side to side in the same direction as the aforesaid split, laterally concaving the inner face of each of said branches a distance coextensive with the remainder of its fin, and forming over a dart inserted between said branches with its tip resting on said crotch-line, said two branches, said dart being an exact counterpart of a sucker rod end with a full width tip at right angles to its length and parallel sides laterally convexed their full length from the tip, whereby said branches are given the contour exactly complementary to that of the sucker rod end, thereby assuring an exact and solid seating of the rod end in the coupling.

4. A one-piece sucker rod coupling member comprising a single bar of metal split for a portion of its length forming two substantially parallel branches, said branches being spread apart from the beginning of the split a distance equal to and on an angle corresponding to the tapered end of a sucker rod, said branches thence being parallel, said branches, throughout, having lateral concave curvatures corresponding to the lateral convex curvatures of a sucker rod end to be received therebetween, said member having a definite straight crotch-line seat at the inner end of said split extending laterally through said bar from side to side and adapted to exactly seat the tip of said sucker rod end, whereby a sucker rod end may have solid and immovable bearing therein throughout, and against the crotch-line seat thereof.

5. A one-piece sucker rod coupling member blank comprising a single bar of metal split for a portion of its length forming two substantially parallel branches, said branches being spread apart from the beginning of the split a distance equal to and on an angle corresponding to the tapered end of a sucker rod and, throughout said spread portion, having their inner faces shaped complementary to the corresponding lateral faces of said tapered end, said member having a definite crotch-line seat extending laterally therethrough from side to side at the beginning of the split at right angles to the longitudinal axis of the bar and adapted to receive and accurately seat the tip of a sucker rod end whereby a sucker rod end may have solid and immovable bearing therein throughout and against the crotch-line seat thereof.

6. A one-piece sucker rod coupling member blank comprising a single bar of metal split for a portion of its length forming two substantially parallel branches, said branches being spread apart from the beginning of the split a distance equal to and on an angle corresponding to the tapered end of a sucker rod, said member having a definite crotch-line seat extending laterally therethrough from side to side at the beginning of the split and adapted to receive and accurately seat the tip of a sucker rod end.

7. A one-piece sucker rod coupling member comprising a bar of metal split for a portion of its length forming two parallel branches, said branches being spread apart from the beginning of the split a distance equal to and on an angle corresponding to the tapered end of a sucker rod, said branches thence being parallel and, throughout, having their inner faces shaped complementary to the cooperating lateral face of a sucker rod end to be received therebetween, said member having a definite straight crotch-line seat at the inner end of said split extending laterally through said bar from side to side and adapted to exactly seat the tip of said sucker rod end, whereby a sucker rod end may have solid and immovable bearing therein throughout, and against the crotch-line seat thereof.

CHARLES I. LEIBENSPERGER.
FOREST H. THORPE.